US008873544B2

(12) United States Patent
Kouchri

(10) Patent No.: US 8,873,544 B2
(45) Date of Patent: Oct. 28, 2014

(54) DIGITAL TELECOMMUNICATIONS SYSTEM, PROGRAM PRODUCT FOR, AND METHOD OF MANAGING SUCH A SYSTEM

(75) Inventor: Farrokh Mohammadzedeh Kouchri, Boca Raton, FL (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 695 days.

(21) Appl. No.: 13/061,310

(22) PCT Filed: Sep. 15, 2008

(86) PCT No.: PCT/US2008/010731
§ 371 (c)(1),
(2), (4) Date: Mar. 3, 2011

(87) PCT Pub. No.: WO2010/030262
PCT Pub. Date: Mar. 18, 2010

(65) Prior Publication Data
US 2011/0158226 A1  Jun. 30, 2011

(51) Int. Cl.
*H04L 12/66* (2006.01)
*G06F 21/00* (2013.01)
*G10L 21/00* (2013.01)
*G10L 25/00* (2013.01)

(52) U.S. Cl.
USPC ............. 370/352; 713/186; 704/273

(58) Field of Classification Search
CPC .................................................. H04L 65/1076
USPC .............................. 370/352; 704/273; 713/186
See application file for complete search history.

(56) References Cited

U.S. PATENT DOCUMENTS

| 7,222,360 | B1* | 5/2007 | Miller ............................... 726/3 |
| 2003/0221125 | A1* | 11/2003 | Rolfe .............................. 713/201 |
| 2006/0147000 | A1 | 7/2006 | Novi |
| 2007/0055517 | A1* | 3/2007 | Spector .......................... 704/246 |
| 2007/0150726 | A1* | 6/2007 | Sinnreich et al. .............. 713/156 |
| 2007/0233483 | A1* | 10/2007 | Kuppuswamy et al. ....... 704/247 |
| 2007/0255564 | A1 | 11/2007 | Yee et al. |
| 2007/0283142 | A1 | 12/2007 | Milstein et al. |
| 2010/0165981 | A1* | 7/2010 | Kuppuswamy et al. ....... 370/352 |

OTHER PUBLICATIONS

International Search Report for PCT/US2008/010731 dated Jul. 6, 2009 (Form PCT/ISA/210).

* cited by examiner

*Primary Examiner* — Nicholas Jensen
(74) *Attorney, Agent, or Firm* — Buchanan Ingersoll & Rooney PC

(57) ABSTRACT

A digital telecommunications system, a method of managing communications in such a system and a program product for managing audio transmission in a digital communications system can include devices at network endpoints selectively, transparently providing voice samples of sufficient quality for authentication and identification during conversations with the devices. The devices can respond to an authentication request by collecting authentication samples of an ongoing conversation with the samples having sufficient detail for authentication. The devices send the authentication samples in parallel that do not disrupt the conversation. Authentication samples may be verified prior to authentication by comparison against the corresponding portion of the ongoing conversation.

19 Claims, 3 Drawing Sheets

DIGITAL TELECOMMUNICATIONS SYSTEM, PROGRAM PRODUCT FOR, AND METHOD OF MANAGING SUCH A SYSTEM

CROSS-REFERENCE TO RELATED APPLICATIONS

This application is the United States national phase under 35 U.S.C. §371 of PCT International Patent Application No. PCT/US2008/010731, filed on Sep. 15, 2008. This application is incorporated by reference herein.

BACKGROUND OF THE INVENTION

1. Field of the Invention

The present invention is related to voice identification and authentication systems and more particularly, to providing reliable voice identification and authentication in Voice over Internet Protocol (VoIP) based telecommunications systems.

2. Background Description

State of the art telecommunication systems are digital and, frequently, use Internet Protocol (IP) based communications. Unlike analog voice channels with a continuous analog signal, an IP communications system segments audio data, encodes and packetizes the segments and transmits the encoded IP packets between network entities in a connectionless transfer. Bearing in mind that the human ear has a range of no more than 20 Hertz (20 Hz)-20 KHz and typical telecommunications channels may have only bandwidth of hundreds of KHz, audio occupies a very small portion of a typical IP communication. Standards have been developed and promulgated for Voice over IP (VoIP) communications to insure that typical IP networks compensate for transmission delays and address Quality of Service (QoS) issues. These standards select small size for audio segments for encoding as relatively small packets and select transmitting those encoded small packets at a relatively high frequency such that decoding and transmission delays are unnoticeable or, at least, tolerable.

For example, G729 is one such standard audio data compression algorithm for VoIP, wherein raw audio is segmented, typically, into 10 millisecond segments and each segment is compressed in an IP packet. RFC 3551 defines a net audio data stream for a G729 code/decode (codec) with an 8-kbit/sec data rate. See, e.g., www.apps.ietf.org/rfc/rfc3551.html#sec-4.2. While the popular Gxxx telecommunications codecs, such as G723 or G729, provide for efficient package based voice communications, they may not provide adequate or even necessary support for high quality voice data required by state of the art voice recognition.

A growing number of various applications use voice recognition for voice authentication. Typically, these voice authenticated systems store voice signatures, e.g., in a database, that are used to authenticate a caller. These systems may use voice identification and authentication to grant access to sensitive personal data, such as identifying and authenticating bank customers for remote banking. Once authenticated, customers may be granted access respective bank accounts for remote home control with banking systems responding, e.g., using voice commands. Protecting such sensitive personal data and resources against unauthorized access is important to protect the respective customer's property. Other state of the art applications of voice recognition include, for example, using high quality voice signatures for lawful voice signed agreements and voice recorded contracts. These voice identification and authentication applications require high quality voice data for reliable identification and authentication at a quality not provided by standard telecommunications codecs.

While traditional digital voice telecommunications codecs, such as G711 for example, or media based codecs (e.g., for music or video, such as MPEG) may transfer voice with high quality, sufficient quality to meet the authentication needs, VoIP telephony do not.

As noted hereinabove, the voice and audio in VoIP telephony are usually encoded and compressed to allow more efficient bandwidth usage. As further noted this encoding and compression may still allow suitable conversational voice content, it only needs to be sufficient for a human at one end of a conversation to use any of many voice features to recognize his/her partner in a communication. These voice features may include, for example, the partner's language, grammar, sentence building, tones, accents and/or voice patterns. However, a machine uses mainly sound related fewer features to recognize a speaker's voice. These features may include tones, accents and voice patterns that may not be included or encompassed by the popular telecommunications codecs. Thus, the audio data provided in normal telecommunications conversations is of insufficient quality for voice recognition, which is required for reliable identification, authentication and signatures. On the other hand, authenticating using a high quality compact disk (CD) encoding or other media codecs, e.g., sending only the authentication data in a MPEG derivative (e.g., mp3) fails to provide much security, if any. Further, using high quality communications (i.e., sufficient for transferring reliable identification, authentication and signatures) has typically proven to be too costly and to use far too much bandwidth and channel resources.

Thus, there is a need for satisfying the limits of narrowband voice communication systems, such as in state of the art VoIP telephony systems using high-compression codec for conversations, while enabling voice identification, voice authentication and voice signature communications to systems and applications that require high quality voice data.

SUMMARY OF THE INVENTION

It is a purpose of the invention to allow transferring real time voice identification, voice authentication and voice signature date in narrowband communications;

It is another purpose of the invention to facilitate transferring voice identification, voice authentication and voice signature transparently in VoIP communications in real time;

It is yet another purpose of the invention to allow transferring voice identification, voice authentication and voice signature transparently in real time during VoIP communications.

The present invention relates to a digital telecommunications system, a method of managing communications in such a system and a program product for managing audio transmission in a digital communications system. Devices at network endpoints, e.g., session initiation protocol (SIP) devices, selectively, transparently provide voice samples of sufficient quality for authentication and identification during conversations with the devices. The devices respond to an authentication request, e.g., from a bank accounting application, by collecting authentication samples of an ongoing conversation with the samples having sufficient detail for authentication. The devices send the authentication samples in parallel to ongoing conversation data (e.g., segmented in the signaling channel) without disrupting the conversation or violating bandwidth requirements. Authentication samples may be verified prior to authentication by comparison against the corresponding portion of the ongoing conversation.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
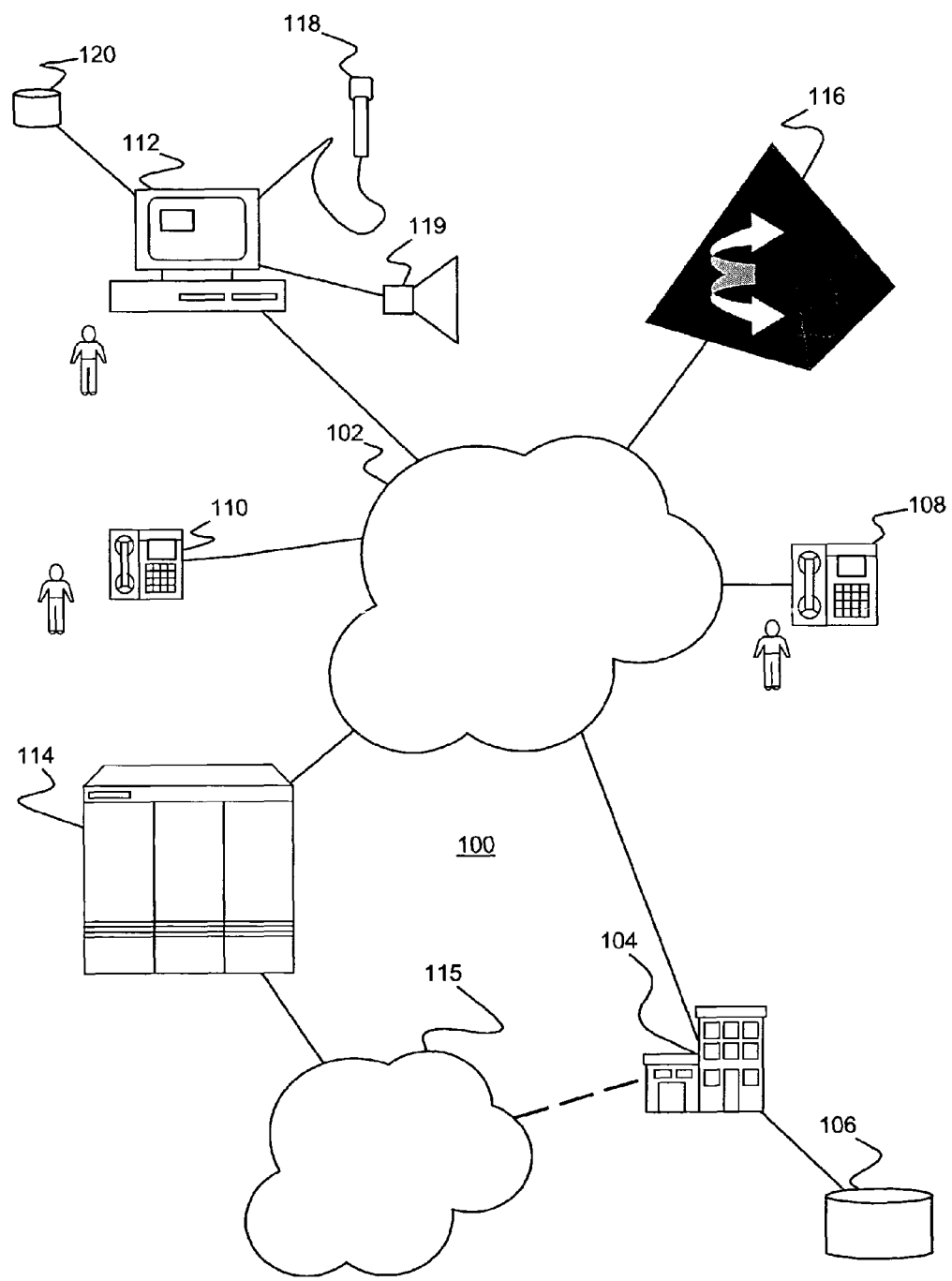
FIG. 1 shows an example of an Internet Protocol (IP) communications system that transparently provides a voice signature of sufficient quality for voice identification and authentication during conversational communication according to a preferred embodiment of the present invention.

Turning now to the drawings and more particularly, FIG. 1 shows an example of an Internet Protocol (IP) communications system 100, e.g., a Voice over IP (VoIP) communications system, transparently providing voice samples and signatures of sufficient quality for voice identification and authentication during conversational communication using a typical high compression codec with corresponding low audio quality, according to a preferred embodiment of the present invention. The preferred system 100 may be a session initiation protocol (SIP) system that includes a digital call capable network 102 coupled to a state of the art voice identification and authentication system 104, e.g., a bank, storing voice signatures, e.g., in non-volatile storage 106. The system includes End Points (EP) 108, 110, 112 with connected digital telephony devices (e.g., VoIP phones) and Multimedia Terminal Adapters (MTA), e.g., keysets, cell phones and/or SIP phones. Since a network device defines an EP, each EP and a device(s) at the EP are referred to herein interchangeably. A gateway 114, e.g., a state of the art media gateway, connects the network externally 115, e.g., to a public switched telephone network/public land mobile network (PSTN/PLMN) and/or the Internet. A preferred softswitch 116 manages network EP communications.

Preferably, the EPs 108, 110, 112 are state of the art VoIP phones and VoIP devices, and in particular high-end VoIP devices with a high quality microphone 118, sophisticated audio circuitry (not shown) and a local speaker 119. Preferably also, state of the art voice identification and authentication system 104 includes one or more substantially similar state of the art VoIP phones and VoIP devices and may be directly connected to the preferred digital call capable network 102 or connected through the external network 115, indicated by the dashed line. Also, although as described herein, each of the SIP devices 108, 110, 112 described in this example includes the requisite audio circuitry, it is understood that this audio circuitry may be included in a media gateway 114 coupling communications devices to state of the art voice identification and authentication system 104 through the external network 115 or distributed between SIP devices 108, 110, 112 and the media gateway 114. Further, media gateway 114 provides the highest available voice data quality to state of the art voice identification and authentication system 104.

While for normal VoIP communications, the EPs 108, 110, 112 use a standard telecom (e.g., Gxxx) codec to transmit live audio data, with voice quality intentionally reduced to fit into narrowband audio channels; when requested, these devices 108, 110, 112 selectively provide access to high quality voice data samples. In particular, these high quality voice data samples are of sufficient detail (e.g., sampling rate and precision) for voice used in state of the art for signatures identification and authentication, referred to herein as authentication samples.

For example, when the bank 104 is performing voice recognition and authentication, it requests that the respective device 108, 110, 112 transmits an authentication sample in parallel. The respective device 108, 110, 112 may avoid surpassing allocated bandwidth limits by limiting the duration of the authentication samples. Further, because they are separate from the conversation, the authentication samples need not be transmitted contemporaneously in quasi real-time, while the authentication completes in relative-time fashion, i.e., during the conversation. So, the respective device 108, 110, 112 may respond to a request by sampling audio data for a selected period of time sufficient for authentication at a selected authentication quality, and the collected sample data is spooled, e.g., in EP storage 120, and transmitted at a relatively low rate for the volume of collected data. The authentication period and quality may be specified, for example, in the request or by default.

In VoIP telephony systems with signaling and media channels using separate transmission channels, authentication samples may transfer in either of these channels, or in any other available channel. Preferably, however, authentication samples transfer in the more reliable channel, e.g., signaling. Authenticity of the source of data may be ensured by requesting a random sampling of a respective conversation. Furthermore, by referencing the authentication samples against real-time audio transmissions, authenticity may be validated by the continuity of the real-time conversation itself, e.g., using typical state of the art audio content comparison methods to compare an authentication sample(s) against the corresponding real-time audio. This authenticity comparison may be initiated with a simple request signal. Further, processing such an authenticity request may be subject to mutual agreement and negotiation, e.g., by user preauthorization or by prompting for user authorization. Moreover, either or both the authentication sample(s) and the corresponding real-time audio may be encrypted using well known data encryption, in addition to or in consonance with normal network encryption.

Figure 2:
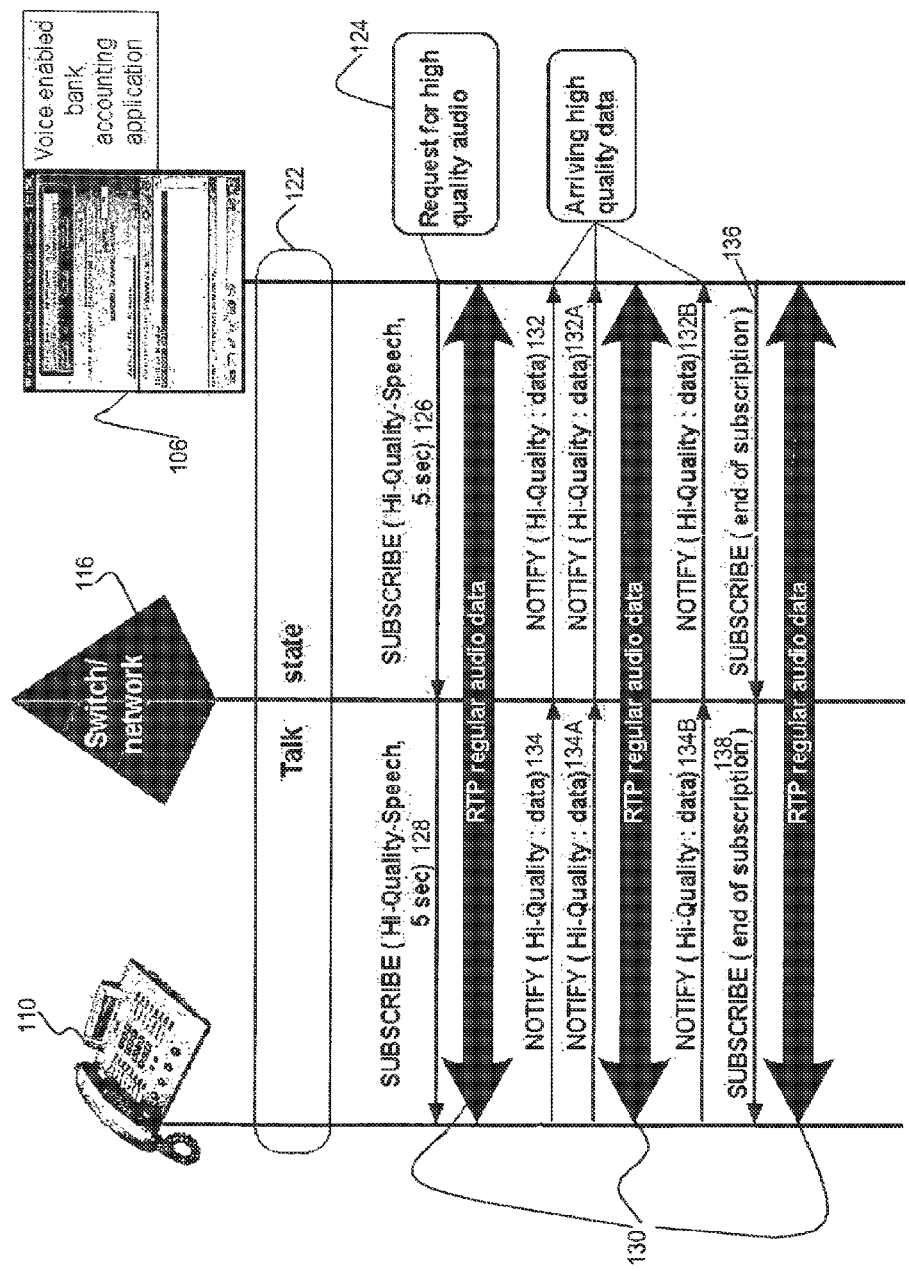
FIG. 2 shows an example of voice identification and authentication signaling, e.g., between a SIP phone and a bank application according to a preferred embodiment of the present invention.

FIG. 2 shows an example of voice identification and authentication signaling, e.g., between SIP phone 110 and bank 104 through digital call capable network 102 and/or external network 115 in the system 100 of FIG. 1, according to a preferred embodiment of the present invention. In this example, a user at SIP phone 110 calls the bank customer service (e.g., a banking application or bank accounting system 106) through the softswitch 116 in his/her provider network 102, establishing a stable call talk state 122 between them. Bank customer service decides to authenticate the caller using voice authentication and so, initiates 124 sending a "hi-Quality-audio request" 126 to the softswitch 116 with a Subscribe (Hi-Quality speech, 5 sec) SIP request that requests a 5 second authentication sample in this example. The softswitch 116 forwards the SIP request 128 through network to the SIP phone 110, while the regular ongoing audio exchange continues through a Real-time Transport Protocol (RTP) channel 130. The SIP phone 110 responds to the SIP request 128 by beginning to collect the requested authentication sample for the next 5 seconds. Since the sample size is relatively large as compared to voice communications data, in this example, the sample is fragmented or segmented, and the segments are transferred spread over a sufficient period of time to minimize/eliminate the impact of transferring the entire sample on communications system load.

So, the first data segment is sent 132 to the softswitch 116 in a SIP message, a Notify (Hi-Quality:data) message. The softswitch 116 forwards the SIP message 134 to the bank 104 for bank accounting system 106. Subsequently, remaining segments are sent in SIP messages 132A, 132B to the softswitch 116, which forwards the segments 134A, 134B to the bank 104 for bank accounting system 106, while the regular ongoing audio exchange continues through RTP channel 130. It should be noted that the same RTP channel 130 is shown 3 times to indicate that the audio exchange is ongoing. Also, it should be noted that each data segment may be sent as soon as collecting it is complete with each of 132, 132A, 132B and 134, 134A, 134B being 1⅓ seconds apart for the 5 second sample on this example. Alternately, the segments may be sent at any suitable pace, and/or the entire segment may be collected, segmented and the segments sent in any order. After the requested sample has been transferred (i.e., the last segment is forwarded 134B), the bank 104 or bank accounting system 106 may signal the termination, e.g., sending a SIP Subscribe (end of subscription) message 136 to the softswitch 116. The softswitch 116 forwards the SIP Subscribe message 138 through network to the SIP phone 110; again while the regular ongoing audio exchange continues through RTP channel 130.

Since the regular live audio connection is maintained through RTP channel 130 while the sample is transferred, the RTP channel 130 carries the same audio albeit at a lower quality and with different encoding. As noted hereinabove, the authentication sample and/or segments may be compared against the live audio connection to ensure that the same content is transferred over both channels to insure that, for example, a previously recorded high quality audio (e.g., an mp3) has not been substituted.

Figure 3:
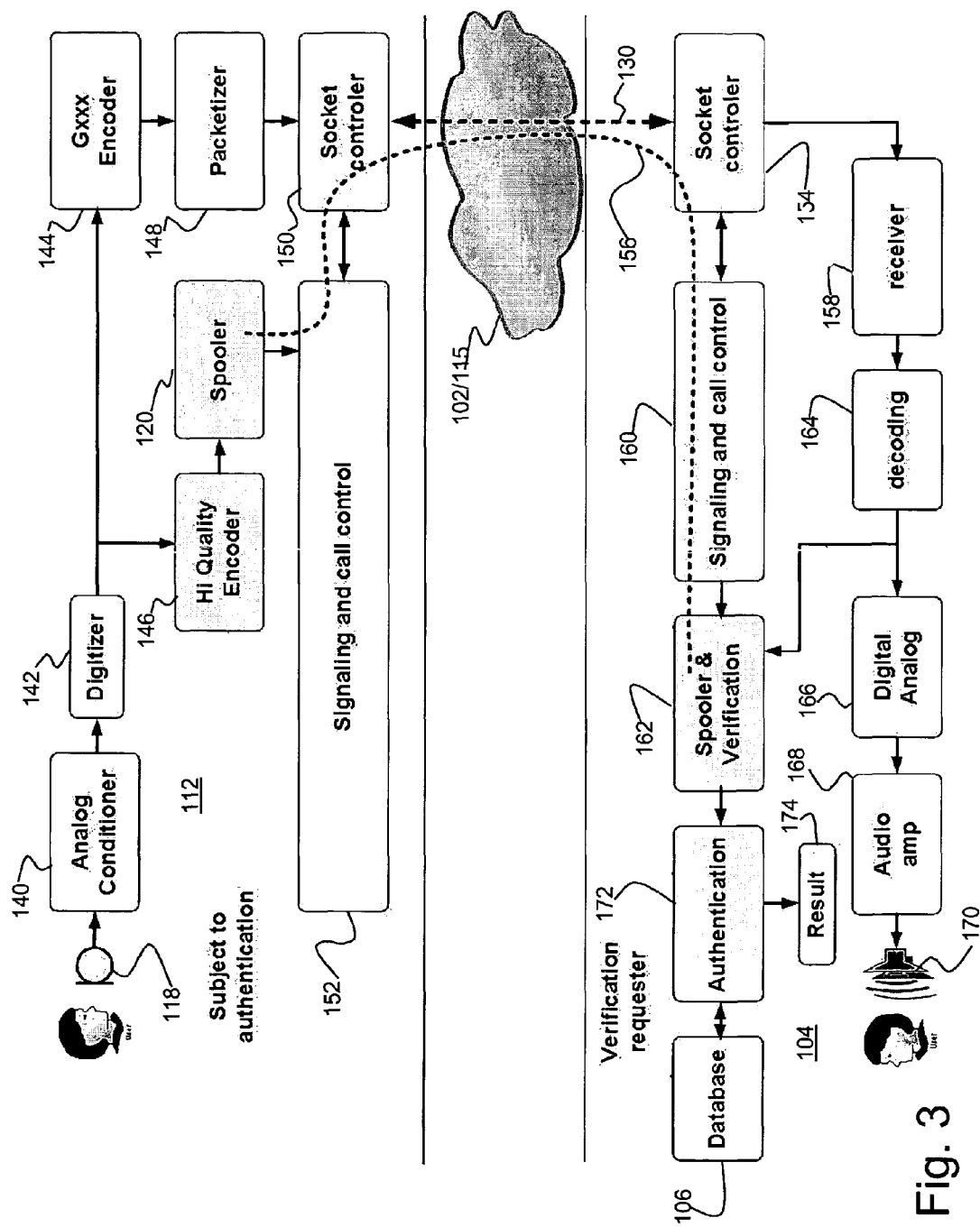
FIG. 3 shows a block diagram example of an implementation of a system for carrying out authentication during a conversation with SIP device.

FIG. 3 shows a block diagram example of an implementation of the system 100 of FIG. 1 carrying out authentication during a conversation with SIP device 112, as in the example FIG. 2 after having established talk state 122 and receiving the Subscribe request 128 at the SIP device 112. As noted hereinabove, SIP device 112 is a high-end VoIP device with a high quality microphone 118, and standard audio circuitry, an analog conditioner 140 for providing a high quality analog audio signal and a digitizer 142 for digitizing the analog audio signal. The digitized audio signal is provided both to a Gxxx codec (e.g., G729) encoder 144 for conversational coding/decoding and to an authentication encoder 146.

Since authentication requires much higher quality data than conversation, the authentication encoder 146 encodes the digitized audio signal to sufficient detail (e.g., sampling rate and precision) for providing voice signatures in identification and authentication. This may be done by hardware and/or software or both. So, for example, the digitizer may provide 16 bit samples at 8K samples per second, which pass directly to authentication encoder 146 with only the most significant 8 bits being passed to G729 codec encoder 144 for every eighth sample. Alternately, the same data may be passed to both encoders 144 and 146 with the G729 codec encoder 144 applying a suitable well known compression algorithm to the digitized audio signal.

The authentication encoder 146 passes the encoded authentication sample (segments) to spooler 120; and the G729 codec encoder 144 passes conversation packets to packetizer 148, which forwards packets to socket controller 150. Signaling and call control 152 selectively forwards spooled segments to socket controller 150. Socket controller 150 in the SIP device 112 establishes a stable call talk state (122) through network 102/115 and socket controller 154 in the bank 104 and controls regular ongoing audio exchanges through RTP channel (130) between them. The socket controllers 150, 154 also establish the SIP messaging channel 156, which carries SIP requests (126, 128) and messages (132, 132A, 132B, 134, 134A, 134B, 136 and 138).

In the bank 104 the socket controller 154 forwards conversation packets to receiver 158 and signaling and call control 160 identifies authentication sample segments, which are forwarded to spooler and verification unit 162. Receiver 158 extracts encoded conversation data from conversation packets and forwards the data to decoder 164, which decodes the encoded conversation data. The decoded conversation data passes to both to spooler and verification unit 162 for real time comparison with sample segments and to a digital to analog (D/A) converter 166. D/A converter 166 converts the decoded conversation data to an analog signal that is amplified by audio amplifier 168 and provided as one end of a conversation on speaker 170. After the complete sample is verified by spooler and verification unit 162, authentication unit 172 compares it against a stored signature from signature database 106 and provides the result 174 of the comparison as success of fail, e.g., to bank accounting system 106. Once the authentication is complete, the authentication unit 172 signals completion (136, 138) through signaling channel 156. Voice signatures may be collected substantially identical to voice authentication with the collected voice signatures stored in signature database 106.

Advantageously, the present invention transparently enables voice identification, voice authentication and voice signature communications in narrowband voice communication systems, e.g., in state of the art VoIP telephony systems, while satisfying the high-compression limits of voice communications codec.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A digital telecommunications system comprising:
one or more voice communications end point devices, each voice communications end point device comprising a microphone, a speaker and audio circuitry, the one or more voice communications end point devices comprising a first end point device;
a voice identification and authentication system connectable to the first end point device via at least one network, the voice authentication and verification system connectable to a non-transitory storage device having at least one voice signature stored therein;
the voice identification and authentication system communicating with the first end point device via a first audio call connection formed between the first end point device and the voice identification and authentication system in which audio data is transmittable between the first end point device and the voice identification and authentication system via a first channel of communication;
the voice identification and authentication system initiating voice authentication by sending a request for a voice sample to the first end point device via a second connection with the first end point device in which data is transferred between the first end point device and the voice identification and authentication system via a second channel of communication;

in response to the request for the voice sample, the first end point device recording a voice sample during the ongoing first audio call connection for transmitting the recorded voice sample to the voice identification and authentication system;

the voice identification and authentication system receiving the recorded voice sample from the first end point device;

the voice identification and authentication system comparing the received recorded voice sample with voice data received from the first end point device in the first audio call connection that is ongoing via the first channel to determine whether the recorded voice sample received from the first end point device sent via the second channel was a live recorded sample recorded during the ongoing first audio call connection and is not a voice sample previously recorded prior to the first audio call connection to verify the received recorded voice sample;

the voice identification and authentication system comparing the received recorded voice sample with a stored voice signature stored in the storage device;

the voice identification and authentication system determining that the received recorded voice sample authenticates the first end point device when the received recorded voice sample is verified as a live recorded sample recorded during the ongoing first audio call connection and a voice of the received recorded voice sample matches a voice of the voice signature; and the voice identification and authentication system determining that the received recorded voice sample does not authenticate the first end point device when at least one of (i) the received recorded voice sample is not verified as being a live recorded sample recorded during the ongoing first audio call connection and (ii) the voice of the received recorded voice sample does not match the voice of the voice signature.

2. The digital telecommunications system of claim 1, wherein the first end point device comprises an analog conditioner and a digitizer.

3. The digital telecommunications system of claim 1, wherein said digital telecommunications system is a Voice over Internet Protocol (VoIP) system, said one or more voice communications end point devices are VoIP communications devices, and said voice identification and authentication system comprising:
 a verification unit configured to compare authentication data from the first end point device with conversation data from the first end point device;
 an authentication unit configured to authenticate verified authentication data against a respective voice signature; and
 a signaling and call control unit configured to identify encoded authentication data forwarded over said network and to forward identified said encoded authentication data to said verification unit and returning authentication results over said network to the first end point device.

4. The digital telecommunications system of claim 3, further comprising:
 a media gateway connected to said network for connecting the first end point device to the voice identification and authentication system.

5. The digital telecommunications system of claim 4, wherein the media gateway comprises an analog conditioner, a digitizer, an audio authentication coder/decoder and a spooler.

6. The system of claim 1, wherein the second channel is a signaling channel.

7. The system of claim 6, wherein the first channel is a media channel.

8. The system of claim 6, wherein the recorded voice sample has a greater quality of data than the voice data transmitted during the ongoing call connection.

9. The system of claim 1, wherein the storage device has a database of voice signatures stored therein.

10. A method of managing Voice over Internet Protocol (VoIP) communications in a communications system, said method comprising:
 a voice identification and authentication system communicating with a first end point device via a first audio call connection formed between the first end point device and the voice identification and authentication system in which audio data is transmittable between the first end point device and the voice identification and authentication system via a first channel of communication;

the voice identification and authentication system initiating voice authentication by sending a request for a voice sample to the first end point device via a second connection with the first end point device in which data is transferred between the first end point device and the voice identification and authentication system via a second channel of communication;

in response to the request for the voice sample, the first end point device recording a voice sample during the ongoing first audio call connection for transmitting the recorded voice sample to the voice identification and authentication system;

the first end point device sending the recorded voice sample to the voice identification and authentication system;

the voice identification and authentication system receiving the recorded voice sample from the first end point device;

the voice identification and authentication system comparing the received recorded voice sample with voice data received from the first end point device in the first audio call connection that is ongoing via the first channel to determine whether the recorded voice sample received from the first end point device sent via the second channel was a live recorded sample recorded during the ongoing first audio call connection and is not a voice sample previously recorded prior to the first audio call connection to verify the received recorded voice sample;

the voice identification and authentication system comparing the received recorded voice sample with a stored voice signature stored in the storage device;

the voice identification and authentication system determining that the received recorded voice sample authenticates the first end point device when the received recorded voice sample is verified as a live recorded sample recorded during the ongoing first audio call connection and a voice of the received recorded voice sample matches a voice of the voice signature;

the voice identification and authentication system determining that the received recorded voice sample does not authenticate the first end point device when at least one of (i) the received recorded voice sample is not verified as being a live recorded sample recorded during the ongoing first audio call connection and (ii) the voice of the received recorded voice sample does not match the voice of the voice signature; and signaling that authentication is complete from said voice identification and authentication system.

11. The method of managing VoIP communications in a communications system of claim 10, wherein the communications system is a session initiation protocol (SIP) communications system and wherein the voice identification and authentication system sending the request for the voice sample to the first end point device comprises the voice identification and authentication system sending a SIP request to a Softswitch and the Softswitch forwarding the SIP request to the first end point device; and
  wherein the first end point device sending the recorded voice sample to the voice identification and authentication system comprises sending authentication segments to said Softswitch and the Softswitch forwarding the authentication segments to said voice identification and authentication system; and
  wherein the signaling that the authentication is complete comprises sending a SIP message to said Softswitch and the Softswitch forwarding that SIP message to the first end point device.

12. The method of managing VoIP communications in a communications system of claim 11, wherein said SIP message and the SIP request are sent through the second channel, the second channel being a SIP signaling channel.

13. The method of claim 10, wherein the second channel is a signaling channel.

14. The method of claim 13, wherein the first channel is a media channel.

15. The method of claim 13, wherein the recorded voice sample has a greater quality of data than the voice data transmitted during the ongoing call connection.

16. A computer program product for managing Voice over Internet Protocol (VoIP) communications in a session initiation protocol (SIP) communications system, said computer program product comprising a non-transitory computer usable medium having computer readable program code stored thereon, said computer readable program code defining a method that is performed by a voice identification and authentication system that executes the computer readable program code, the method comprising:
  the voice identification and authentication system communicating with a communication end point device via a first audio call connection formed between the end point device and the voice identification and authentication system in which audio data is transmitted between the end point device and the voice identification and authentication system via a first channel of communication;
  the voice identification and authentication system initiating voice authentication by sending a request for a voice sample to the end point device via a second connection with the end point device in which data is transferred between the end point device and the voice identification and authentication system via a second channel of communication such that, in response to the request for the voice sample, the end point device records a voice sample during the ongoing first audio call connection for transmitting the voice sample to the voice identification and authentication system;
  the voice identification and authentication system receiving the requested voice sample from the end point device;
  the voice identification and authentication system comparing the received voice sample with voice data received from the end point device in the first audio call connection that is ongoing via the first channel to determine whether the received voice sample from the end point device sent via the second channel was a live recorded sample recorded during the ongoing first audio call connection and is not a voice sample previously recorded prior to the first audio call connection to verify the received voice sample;
  the voice identification and authentication system comparing the received voice sample with a stored voice signature;
  the voice identification and authentication system determining that the received voice sample authenticates the end point device when the received voice sample is verified as a live recorded sample recorded during the ongoing first audio call connection and a voice of the received voice sample matches a voice of the voice signature;
  the voice identification and authentication system determining that the received voice sample does not authenticate the end point device when at least one of (i) the received voice sample is not verified as being a live recorded sample recorded during the ongoing first audio call connection and (ii) the voice of the received voice sample does not match the voice of the voice signature.

17. The computer program product of claim 16 wherein the voice identification and authentication system receives the requested voice sample from the end point device by receiving a plurality of segments of the requested voice sample.

18. A computer program product for managing Voice over Internet Protocol (VoIP) communications in a session initiation protocol (SIP) communications system, said computer program product comprising a non-transitory computer usable medium having computer readable program code stored thereon, said computer readable program code defining a method that is performed by an end point device that executes the computer readable program code, the method comprising:
  the end point device communicating with a voice identification and authentication system via a first audio call connection formed between the end point device and the voice identification and authentication system in which audio data is transmitted between the end point device and the voice identification and authentication system via a first channel of communication;
  the end point device receiving a request for a voice sample sent by the voice identification and authentication system via a second connection with the end point device in which data is transferred between the end point device and the voice identification and authentication system via a second channel of communication;
  in response to the received request for the voice sample, the end point device recording a voice sample during the ongoing first audio call connection for transmitting the voice sample to the voice identification and authentication system for providing a verifiable voice sample that matches a voice signature to the voice identification and authentication system such that the voice sample is comparable with voice data transmitted by the end point device to the voice identification and authentication system in the first audio call connection that is ongoing via the first channel for verifying that the voice sample from the end point device sent via the second channel is a live recorded sample recorded during the ongoing first audio call connection and is not a voice sample previously recorded prior to the first audio call connection and such that the voice sample is comparable to a voice signature by the voice identification and authentication system compares the received for authentication of the end point device.

19. The computer program product of claim 18, wherein the end point device sends the voice sample to the voice identification and authentication system in fragments.

\* \* \* \* \*